United States Patent
Konolige et al.

(10) Patent No.: US 11,195,041 B2
(45) Date of Patent: Dec. 7, 2021

(54) GENERATING A MODEL FOR AN OBJECT ENCOUNTERED BY A ROBOT

(71) Applicant: X Development LLC, Mountain View, CA (US)

(72) Inventors: Kurt Konolige, Menlo Park (CA); Nareshkumar Rajkumar, Cupertino (CA); Stefan Hinterstoisser, Munich (DE)

(73) Assignee: X DEVELOPMENT LLC, Mountain View, CA (US)

( * ) Notice: Subject to any disclaimer, the term of this patent is extended or adjusted under 35 U.S.C. 154(b) by 34 days.

(21) Appl. No.: 16/864,591

(22) Filed: May 1, 2020

(65) Prior Publication Data

US 2020/0265260 A1    Aug. 20, 2020

Related U.S. Application Data

(63) Continuation of application No. 16/042,877, filed on Jul. 23, 2018, now Pat. No. 10,671,874, which is a
(Continued)

(51) Int. Cl.
*G06K 9/32* (2006.01)
*B25J 9/16* (2006.01)
(Continued)

(52) U.S. Cl.
CPC ............ *G06K 9/3241* (2013.01); *B25J 9/161* (2013.01); *B25J 9/1692* (2013.01);
(Continued)

(58) Field of Classification Search
CPC .... G06K 9/3241; G06K 9/00664; G06T 7/75; G06T 7/70; G06T 7/344; G06T 17/00;
(Continued)

(56) References Cited

U.S. PATENT DOCUMENTS 6,615,109 B1    9/2003    Matsuoka et al.
7,936,902 B2    5/2011    Kinoshita
(Continued)

FOREIGN PATENT DOCUMENTS

WO    2014008949    1/2014
WO    2013192492    2/2019

OTHER PUBLICATIONS

International Bureau of WIPO, International Preliminary Report on Patentability of PCT Ser. No. PCT/US2017/044933; 7 pages; dated Feb. 14, 2019.
(Continued)

*Primary Examiner* — Jerome Grant, II
(74) *Attorney, Agent, or Firm* — Middleton Reutlinger

(57) ABSTRACT

Methods and apparatus related to generating a model for an object encountered by a robot in its environment, where the object is one that the robot is unable to recognize utilizing existing models associated with the robot. The model is generated based on vision sensor data that captures the object from multiple vantages and that is captured by a vision sensor associated with the robot, such as a vision sensor coupled to the robot. The model may be provided for use by the robot in detecting the object and/or for use in estimating the pose of the object.

15 Claims, 9 Drawing Sheets

Related U.S. Application Data continuation of application No. 15/227,612, filed on Aug. 3, 2016, now Pat. No. 10,055,667.

(51) Int. Cl.

| | | |
|---|---|---|
| *G06T 7/73* | (2017.01) | |
| *G06K 9/00* | (2006.01) | |
| *G06T 17/00* | (2006.01) | |
| *G06T 7/33* | (2017.01) | |
| *G06T 7/70* | (2017.01) | |

(52) U.S. Cl.
CPC .......... *G06K 9/00664* (2013.01); *G06T 7/344* (2017.01); *G06T 7/70* (2017.01); *G06T 7/75* (2017.01); *G06T 17/00* (2013.01); *G05B 2219/33038* (2013.01); *G05B 2219/39046* (2013.01); *G05B 2219/39543* (2013.01); *G05B 2219/40564* (2013.01); *G06T 2207/10012* (2013.01); *G06T 2207/10028* (2013.01); *G06T 2207/20081* (2013.01); *G06T 2207/20084* (2013.01); *G06T 2207/30244* (2013.01)

(58) Field of Classification Search
CPC . G06T 2207/10012; G06T 2207/10028; G06T 2207/20081; G06T 2207/20084; G06T 2207/30244; B25J 9/161; B25J 9/1692; G05B 2219/33038; G05B 2219/39046; G05B 2219/39543; G05B 2219/40564
USPC ......................................................... 382/154
See application file for complete search history.

(56) References Cited

U.S. PATENT DOCUMENTS

| | | | |
|---|---|---|---|
| 8,024,072 B2 | 9/2011 | Park et al. | |
| 8,073,528 B2 | 12/2011 | Zhao et al. | |
| 8,189,905 B2 | 5/2012 | Eaton et al. | |
| 8,422,797 B2 | 4/2013 | Heisele et al. | |
| 8,447,863 B1 | 5/2013 | Francis et al. | |
| 8,485,017 B1 | 7/2013 | Trompeter | |
| 8,996,429 B1 | 3/2015 | Francis et al. | |
| 9,020,053 B2 | 4/2015 | Best | |
| 9,043,025 B2 | 5/2015 | Brooks et al. | |
| 9,092,698 B2 | 7/2015 | Buehler et al. | |
| 9,227,323 B1 | 1/2016 | Konolige et al. | |
| 9,746,855 B2 | 8/2017 | Kobayashi et al. | |
| 9,769,354 B2 | 9/2017 | Thrasher et al. | |
| 9,775,520 B2 | 10/2017 | Tran | |
| 9,789,605 B2 | 10/2017 | Meier et al. | |
| 9,797,995 B2 | 10/2017 | Gilliland et al. | |
| 10,034,630 B2 * | 7/2018 | Lee .......................... A61B 5/18 | |
| 10,058,995 B1 * | 8/2018 | Sampedro ................ B25J 9/163 | |
| 2012/0148145 A1 * | 6/2012 | Liu .......................... G06T 7/73 | 382/154 |
| 2013/0325244 A1 | 12/2013 | Wang et al. | |
| 2013/0343640 A1 * | 12/2013 | Buehler .................. B25J 9/1697 | 382/155 |
| 2014/0118500 A1 * | 5/2014 | Liu ...................... H04N 13/204 | 348/46 |
| 2015/0016712 A1 | 1/2015 | Rhoads et al. | |
| 2015/0127155 A1 * | 5/2015 | Passot ..................... B25J 9/161 | 700/257 |
| 2015/0217449 A1 | 8/2015 | Meier et al. | |
| 2015/0314452 A1 | 11/2015 | Tateno | |
| 2016/0162782 A1 | 6/2016 | Park | |
| 2016/0167226 A1 * | 6/2016 | Schnittman .......... G05D 1/0274 | 382/153 |
| 2017/0252922 A1 | 9/2017 | Levine et al. | |
| 2017/0252924 A1 | 9/2017 | Vijayanarasimhan et al. | |
| 2017/0329347 A1 | 11/2017 | Passot et al. | |
| 2018/0261131 A1 | 9/2018 | Asada | |
| 2019/0047149 A1 | 2/2019 | Wouhaybi et al. | |
| 2019/0094844 A1 | 3/2019 | Hemken | |
| 2019/0156837 A1 | 5/2019 | Park et al. | |
| 2019/0248005 A1 | 8/2019 | Washizu et al. | |
| 2019/0265657 A1 | 8/2019 | Inagaki et al. | |
| 2019/0270201 A1 | 9/2019 | Ding et al. | |
| 2019/0286908 A1 | 9/2019 | Shintani et al. | |
| 2019/0332969 A1 * | 10/2019 | Ando ..................... G06N 20/00 | |

OTHER PUBLICATIONS

Ude, Aleš, Damir Omrčen, and Gordon Cheng. "Making object learning and recognition an active process." International Journal of Humanoid Robotics 5.02 (2008): 267-286.

Bernardini et al. "The 3D Model Acquisition Pipeline." Computer graphics forum. vol. 21. No. 2. Blackwell Publishers Ltd, 2002. 24 pages. 2002.

Gupta et al. "Learning Rich Features from RGB-D Images for Object Detection and Segmentation." European Conference on Computer Vision. Springer International Publishing, 2014. 16 pages.

Rosales et al. "3D Hand Pose Reconstruction Using Specialized Mappings." Computer Vision, 2001. ICCV 2001. Proceedings. Eighth IEEE International Conference on. vol. 1. IEEE, 2001. 9 pages.

Vatahska et al. "Feature-Based Head Pose Estimation from Images." 2007 7th IEEE-RAS International Conference on Humanoid Robots. IEEE, 2007. 6 pages.

Krainin et al. "Manipulator and Object Tracking for In-Hand 3D Object Modeling." The International Journal of Robotics Research 30.11 (2011): 1311-1327.

International Search Report and Written Opinion of PCT Ser. No. PCT/US2017/044933; 10 pages dated Nov. 11, 2017.

* cited by examiner

GENERATING A MODEL FOR AN OBJECT ENCOUNTERED BY A ROBOT

BACKGROUND

In performing various robotic tasks, it may be beneficial and/or necessary for robots to detect environmental objects and/or to estimate poses (positions and orientations) for those detected objects. For example, a robot may need to know an object's pose before determining how best to pick it up (e.g., with a robotic arm of the robot). Various techniques have been utilized for detecting objects and estimating their poses. For example, a robot may have access to a complete three-dimensional ("3D") object model of an object that is a generated CAD model of the object. The robot may acquire data from a 3D laser scanner or other 3D vision sensor (e.g., stereographic camera) viewing a portion of the robot's environment, and map such data to the complete 3D object model to determine the object is present in the environment and to estimate the object's pose in the environment.

However, in many situations a robot may encounter an object in its environment that it is unable to recognize. For example, the robot may encounter an object that does not sufficiently match an existing 3D model and, as a result, be unable to detect the object and/or estimate a pose of the object.

SUMMARY

Implementations of this specification are directed generally to methods and apparatus related to generating a model for an object encountered by a robot in its environment, where the object is one that the robot is unable to recognize utilizing existing models associated with the robot. The model is generated based on vision sensor data that captures the object from multiple vantages and that is captured by a vision sensor associated with the robot, such as a vision sensor coupled to the robot. The model may be provided for use by the robot in detecting the object and/or for use in estimating the pose of the object. As described herein, the vision sensor data may include depth data in various implementations, such as implementations where the vision sensor is a stereographic camera, a 3D laser scanner, or other 3D vision sensor. For example, the vision sensor data may include a 3D point cloud captured by a 3D laser scanner or may include multiple images captured by a stereographic camera and that each include a depth channel and optionally red, blue, green, and/or grayscale channels.

In some implementations, the model is a machine learning model such as a convolutional neural network ("CNN") model or other neural network model for use in detecting the object and/or estimating the pose of the object. In some of those implementations, the vision sensor data is utilized to generate an object model of the object (e.g., an at least partial 3D object model), the object model is utilized to generate rendered images of the object at a plurality of different poses and with varying additional content, and the rendered images are utilized as training example input of training examples used to train the machine learning model. The trained machine learning model may be provided for use by the robot in detecting the object and/or estimating the pose of the object.

In some implementations of generating rendered images with varying additional content, the varying additional content may provide diversity in the rendered images, thereby providing diversity in the training example input and robustness in a machine learning model trained based on such training example input. As described herein, some or all of the varying additional content of rendered images may optionally be based on an environment of the robot, which may optionally enable a machine learning model to be trained that is tailored to the environment of the robot and that may provide improved performance in that environment relative to one or more models not trained based on that environment.

In some implementations, a robot may submit a request to a model generation system to cause the model generation system to generate a model of an object and to provide the model in response to the request. The model generation system may be implemented on one or more computing devices that are remote from the robot, and/or by one or more processors of the robot. In some of those implementations, one or more processors associated with a robot may determine that an object in the environment of the robot is not recognizable. In response to determining the object is not recognizable, the robot may capture vision sensor data with a vision sensor of the robot, where the vision sensor data captures the object from a plurality of vantages. The vision sensor data may be submitted with the request and the model of the object that is received in response to the request may be generated based on the vision sensor data. The model of the object may be, for example, an object model of the object and/or a machine learning model trained to enable detection of the object and/or estimation of the pose of the object.

In some implementations, determining that an object is not recognizable may include applying vision sensor data that captures the object to one or more existing object models or existing machine learning models, and determining that the object is not recognizable based on the existing models. In some implementations, capturing vision sensor data that captures the object from a plurality of vantages may include moving a vision sensor of the robot (e.g., via locomotion of the robot) relative to the object and/or moving the object relative to the vision sensor (e.g., via grasping and moving the robot with an end effector of the robot).

In some implementations, a method is provided that includes receiving vision sensor data that is generated by a vision sensor associated with a robot and that captures an object in an environment of the robot. The method further includes generating an object model of the object based on the vision sensor data and generating a plurality of rendered images based on the object model. The rendered images capture the object model at a plurality of different poses relative to viewpoints of the rendered images. Generating the rendered images based on the object model includes: rendering a first image that renders the object model and that includes first additional content and rendering a second image that renders the object model and that includes second additional content that is distinct from the first additional content. The method further includes: generating training examples that each include a corresponding one of the rendered images as training example input and that each include an indication of the object as training example output; and training a machine learning model based on the training examples.

This method and other implementations of technology disclosed herein may each optionally include one or more of the following features.

In some implementations, rendering the first image with the first additional content includes rendering the object model onto a first background, and rendering the second image with second additional content includes rendering the object model onto a second background that is distinct from the first background. In some versions of those implementations, the method further includes selecting the first background and the second background based on the environment of the robot. Selecting the first background based on the environment of the robot may optionally include selecting the first background based on an additional image captured by the vision sensor or an additional vision sensor in the environment of the robot.

In some implementations, rendering the first image with the first additional content includes: rendering the first image based on a scene that includes the object model and a first additional object model of a first additional object; and rendering the second image with the second additional content includes: rendering the second image based on an additional scene that includes the object model and one or both of: the first additional object model at a pose relative to the object model that is different from that of the scene; and a second additional object model that is not present in the scene. In some versions of those implementations, the method further includes selecting the first additional object model based on the environment of the robot.

In some implementations, the training example output of each of the training examples further includes a corresponding pose of the object model in the corresponding one of the rendered images.

In some implementations, the rendered images each include a plurality of color channels and a depth channel.

In some implementations, the vision sensor data includes a plurality of images of the object in the environment and the method further includes: generating a plurality of additional training examples that each include additional training example input based on a corresponding one of the images of the object in the environment and that each include the indication of the object as training example output. Training the machine learning model may be further based on one or more of the images of the object in the environment. In some of those implementations, the additional training example output of each of the additional training examples further includes a corresponding pose of the object in the corresponding one of the images. In some versions of those implementations, the method further includes determining the pose of the object in a given image of the images based on mapping the given image to the object model.

In some implementations, the vision sensor data is received from the robot over one or more network interfaces and the method further includes providing, via one or more of the network interfaces, the trained machine learning model to the robot for use by the robot.

In some implementations, a method is provided that includes identifying vision sensor data that is generated by a vision sensor coupled to a robot and that captures a portion of an environment of the robot. The method further includes determining, based on application of the vision sensor data to one or more object models or machine learning models, that an object in the environment is not recognizable based on the object models or the machine learning models. The method further includes, in response to determining the object is not recognizable, capturing additional object vision sensor data with the vision sensor. Capturing the additional object vision sensor data includes moving at least one of the vision sensor and the object to capture, in the additional object vision sensor data, the object from a plurality of vantages. The method further includes providing the additional object vision sensor data to a model generation system and receiving a model of the object in response to providing the additional object vision sensor data. The model may be an additional object model, or an additional machine learning model trained based on the additional object vision sensor data.

This method and other implementations of technology disclosed herein may each optionally include one or more of the following features.

In some implementations, the model generation system is implemented on one or more remote computing devices and providing the additional object vision sensor data includes providing the additional object visions sensor data via one or more network interfaces.

In some implementations, the model is the additional machine learning model trained based on the additional object vision sensor data. In some of those implementations, the method further includes providing additional images to the model generation system, wherein the additional machine learning model is further trained based on the additional images.

Other implementations may include a non-transitory computer readable storage medium storing instructions executable by one or more processors (e.g., central processing unit(s) (CPU(s)) or graphics processing unit(s) (GPU(s))) to perform a method such as one or more of the methods described above. Yet another implementation may include a system of one or more computers and/or one or more robots that include one or more processors operable to execute stored instructions to perform a method such as one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
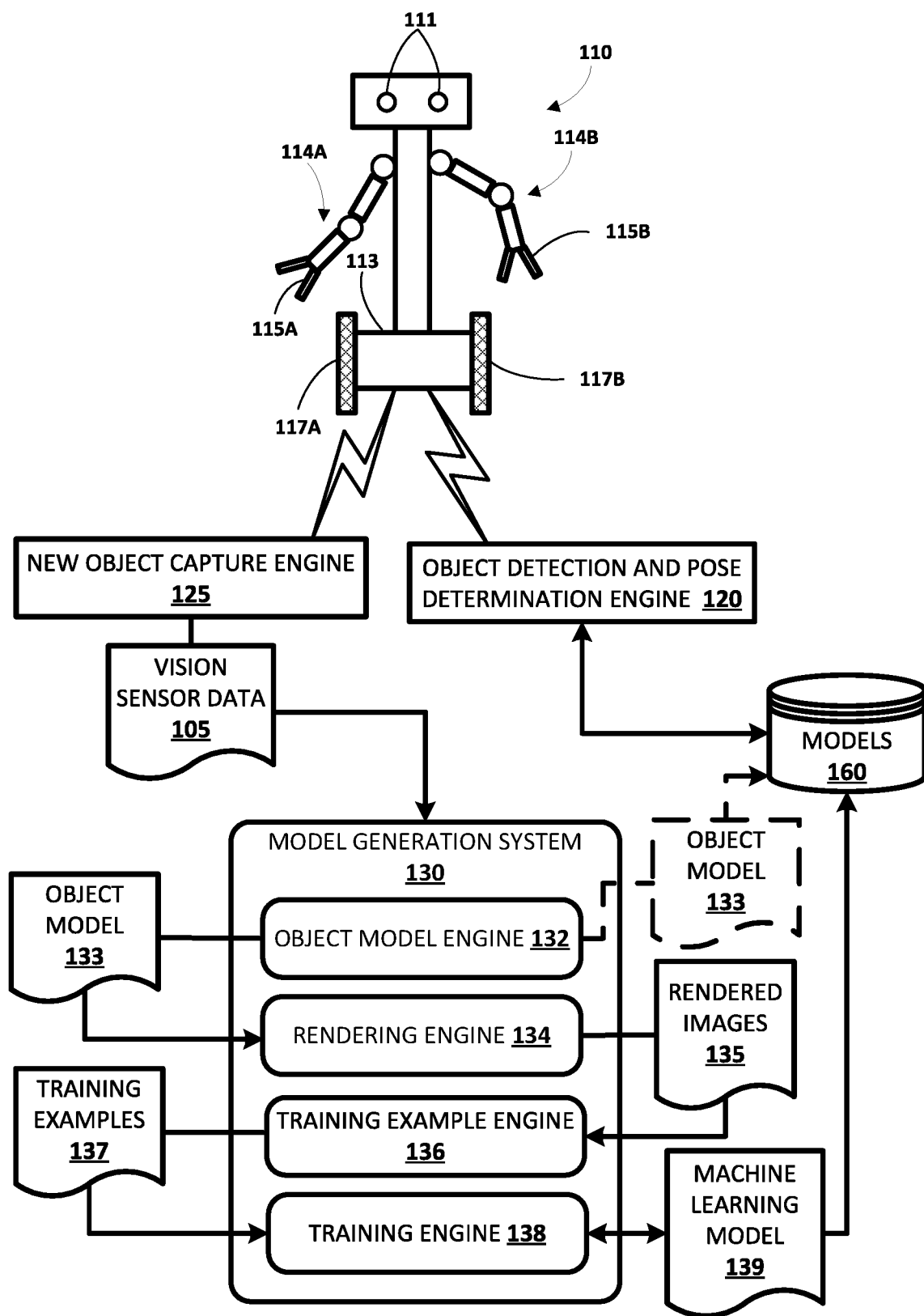
FIG. 1 illustrates an example environment in which implementations disclosed herein may be implemented.

Implementations of this specification are directed generally to methods and apparatus related to generating a model for an object encountered by a robot in its environment, where the object is one that the robot is unable to recognize utilizing existing models associated with the robot.

In some implementations, in response to encountering an unrecognizable object, a robot captures multiple images of the object using a vision sensor associated with the robot, such as a stereographic camera coupled to the robot. In some of those implementations, the robot may move the vision sensor (e.g., via locomotion of the robot) relative to the new object and/or move the new object relative to the vision sensor (e.g., via grasping and moving the robot with an end effector of the robot) to enable images of the new object to be captured from multiple vantages/viewpoints. The images may be, for example, two-dimensional ("2D") images (i.e., from a monocular camera) or "2.5D" images (e.g., from a stereographic camera or laser scanner) that also capture depth.

The multiple images of the new object may be utilized to generate an object model of the new object, such as a partial three-dimensional ("3D") model of the new object. Various techniques may be utilized to generate the object model. For example, a partial 3D model of an object may be created based on isolating the object in each of multiple images that capture the object, and "stitching" together the object as it is captured in each of the images. For instance, the object may be isolated in each of the images by removing background from the images, by removing robotic component(s) present in the image (e.g., the end effector), etc. The object may be stitched together based on pose information and/or other data associated with the multiple images. For example, the images may each be associated with pose information that indicates a relative pose between the object and a vision sensor that captured the object (e.g., based on a pose of the vision sensor and/or a pose of an end effector that optionally grasps the object in the image) and the pose information used to determine which images capture the same part of, or adjoining parts of, an object.

In some implementations, a generated object model may be used to generate a plurality of rendered images that capture the object model at a plurality of different poses relative to viewpoints of the rendered image. For example, for an object having multiple surfaces, a first rendered image may capture only a first surface, a second rendered image may capture only a second surface, a third rendered image may capture part of the first surface and part of the second surface, a fourth rendered image may capture different parts of the first and second surfaces, etc.

In various implementations of generating rendered images based on an object model, one or more rendering features may vary across the rendered images. In some of those implementations, the features may include additional content that is in addition to the rendering of the object model and that varies across multiple of the rendered images. For example, the additional content may be a background onto which the object model is rendered. For instance, a first image may render the object model onto a first background (e.g., an image of a patterned carpet), a second image may render the object model onto a second background (e.g., an image of a desk), etc. Also, for example, the additional content may include additional object models in scenes on which the rendered images are based and may vary by, for instance, including different additional object models in the scenes and/or including in the scenes additional object models in different poses relative to the object model. For instance, a first image may be rendered based on a scene that includes a "target" object model of a mug, and includes additional object models of a plate and a vase that are positioned around the target object model. A second image may be rendered based on a scene that includes the target object model of the mug and the plate and the vase positioned around the target object model at relative poses that are unique from their poses in the scene used to render the first image. A third image may be rendered based on a scene that includes the target object model of the mug, and includes additional object models of a coffee maker, a pot, and a pan.

In some implementations, one or more of the backgrounds and/or one or more of the additional object models utilized as additional content may optionally be selected based on an environment of a robot that will utilize a model trained based on the rendered images. For example, if the robot operates in a residential environment, then backgrounds that depict object(s) likely to be found in a residential environment may be utilized. Also, for example, actual images captured by the robot in its environment may be used to generate the backgrounds. As yet another example, additional object models of objects likely to be found in a robot's environment may be included along with the object model in scenes on which rendered images are based. Rendering the object model with additional content that is based on the environment of the robot may enable a machine learning model to be trained that is tailored to the environment of the robot and that may provide improved performance in that environment relative to one or more models not trained based on that environment. Additional and/or alternative features may be varied across the rendered images. For example, lighting magnitude, direction, and/or color; translucency of the object model; color(s) of the object model; shadows; and/or other features may be varied.

Rendered images may be used as training example input of training examples for training a machine learning model to detect the object and/or to estimate a pose of the object. The training example output of each of the training examples can include an indication of the object and/or a pose of the object in the corresponding rendered image. The indication of the object can be an indication of whether the object is present and/or an identifier of the object. The identifier of the object can be a semantically meaningful identifier (e.g., "coffee cup") and/or an identifier that is not semantically meaningful (e.g., "3FE8OA51"). In some implementations, the indication of whether the object is present may be the training example output and the identifier of the content may be assigned to the machine learning model. The pose of the object in a rendered image can be determined based on the viewpoint of the rendered image and the pose of the object model in the rendered image. For example, the pose of the object in the rendered image can be the pose of the object model relative to the viewpoint of the rendered image. As another example, the pose of the object can be the pose of the object model relative to a reference frame of a robot for which it is being trained, when the translation between the pose of the vision sensor of the robot and the pose of the reference frame of the robot is known.

In some implementations, the images that are used to generate the object model and/or additional "real world" (non-rendered) images of the object may be utilized to generate additional training examples for training the machine learning model. The additional training examples may each include one of the images (optionally resized or otherwise transformed) as training example input and the identifier of the object as training example output. In implementations where the machine learning model is trained to also estimate the pose of the object, the additional training examples may also include a pose of the object as training example output. The pose of the object for a real world image may be determined, for example, based on mapping the image to the generated object model of the object and/or based on sensor data provided by the robot that captured the image (e.g., based on a pose of the end effector of the robot where the object is grasped by the end effector in capturing the image).

After the training examples are used to train a machine learning model, the machine learning model may be provided for use by the robot in detecting the object and/or estimating the pose of the object. For example, where a remote computer system trains the machine learning model, it may transmit the trained machine learning model to the robot for use by the robot.

Turning now to the Figures, FIG. 1 illustrates an example environment in which implementations disclosed herein may be implemented. The example environment includes a robot 110, an object detection and pose determination engine 120, a new object capture engine 125, a model generation system 130, and a models database 160.

The robot 110 is a mobile robot and has access to one or more portions of an environment such as a building (e.g., a warehouse, a manufacturing facility, an office building), one or more particular rooms in a building, one or more buildings of a collection of nearby buildings, one or more floors of a multi-floor office or other building, etc. Additional and/or alternative robots may be provided, such as additional robots that vary in one or more respects from robot 110 illustrated in FIG. 1. For example, a stationary robot arm, a mobile telepresence robot, a mobile forklift robot, an unmanned aerial vehicle ("UAV"), and/or a humanoid robot may be utilized instead of or in addition to robot 110. One or more provided additional and/or alternative robots may embody and/or be in communication with the same or separate instances of engine 120, engine 125, system 130, and/or models database 160 described in more detail below.

Robot 110 includes a base 113 with wheels 117A, 117B provided on opposed sides thereof for locomotion of the robot 110. The base 113 may include, for example, one or more motors for driving the wheels 117A, 117B of the robot 110 to achieve a desired direction, velocity, and/or acceleration of movement for the robot 110.

Robot 110 also includes a vision sensor 111 that can generate images related to shape, color, depth, and/or other features of object(s) that are in the line of sight of the vision sensor 111. The vision sensor 111 may be, for example, a monocular camera, a stereographic camera, and/or a 3D laser scanner. A 3D laser scanner may include one or more lasers that emit light and one or more sensors that collect data related to reflections of the emitted light. The 3D laser scanner may generate vision sensor data that is a 3D point cloud with each of the points of the 3D point cloud defining a position of a point of a surface in 3D space. A monocular camera may include a single sensor (e.g., a charge-coupled device (CCD)), and generate, based on physical properties sensed by the sensor, images that each includes a plurality of data points defining color values and/or grayscale values. For instance, the monocular camera may generate images that include red, blue, and/or green channels. Each channel may define a value for each of a plurality of pixels of the image such as a value from 0 to 255 for each of the pixels of the image. A stereographic camera may include two or more sensors, each at a different vantage point. In some of those implementations, the stereographic camera generates, based on characteristics sensed by the two sensors, images that each includes a plurality of data points defining depth values and color values and/or grayscale values. For example, the stereographic camera may generate images that include a depth channel and red, blue, and/or green channels.

Robot 110 also includes one or more processors that, for example: provide control commands to actuators and/or other operational components thereof; determine poses of objects based on vision sensor data and models of those objects; generate control commands for various tasks based at least in part on a pose of an object determined according to techniques described herein; generate commands to enable capturing of images of an object from multiple vantages; etc. For example, one or more processors of robot 110 may implement all or aspects of new object capture engine 125, object detection and pose determination engine 120, and/or model generation system 130. Also, for example, one or more processors of robot 110 may provide control commands to servo motors that drive the wheels of the robot 110 to navigate the robot 110 to various locations in the environment autonomously and/or semi-autonomously. Additional description of some examples of the structure and functionality of various robots is provided herein.

The robot 110 also includes robot arms 114A and 114B with corresponding end effectors 115A and 115B that each take the form of a gripper with two opposing "fingers" or "digits." The robot arms 114A, 114B and end effectors 115A, 115B may be controlled autonomously, semi-autonomously, and/or based on control commands provided by a user via a computing device of a user. For example, the robot arm 114B may be autonomously controlled to position the end effector 115B proximal to an object and the end effector 115B may be autonomously controlled to grasp the object. In some of those implementations, the processor(s) of the robot 110 may generate control commands to control robot arm 114B and/or end effector 115B and generating those control commands may be influenced at least in part by a pose of the object determined according to techniques described herein. Also, in some of those implementations, the processor(s) of the robot 110 may generate control commands to control the robot arm 114B and/or end effector 115B to position the object at a plurality of poses to enable the vision sensor 111 to capture images of the object from multiple vantages.

Although particular grasping end effectors 115A, 115B are illustrated, additional and/or alternative end effectors may be utilized, such as alternative impactive grasping end effectors (e.g., those with grasping "plates", those with more or fewer "digits"/"claws"), "ingressive" grasping end effectors, "astrictive" grasping end effectors, or "contigutive" grasping end effectors, or non-grasping end effectors. Additionally, although a particular placement of vision sensor 111 is illustrated in FIG. 1, additional and/or alternative placements may be utilized. For example, in some implementations a vision sensor may be mounted on arm 114A or on end effector 115A. Also, for example, in some implementations, a vision sensor may be mounted on a non-stationary structure that is separate from its associated robot and/or may be mounted in a non-stationary manner on a structure that is separate from its associated robot.

Object detection and pose determination engine 120 receives vision sensor data from the vision sensor 111. The engine 120 applies the vision sensor data to one or more models stored in models database 160 to detect one or more objects that are captured by the received vision sensor data and/or to determine poses of those objects, such as poses relative to a robot reference frame or other reference frame. The engine 120 may be implemented by one or more processors of the robot 110 and/or by one or more computing devices that are remote from, but in network communication with, the robot 110. The models database 160 includes one or more non-transitory media that are local to the robot 110 and/or that are remote from the robot 110.

The models stored in models database 160 may include one or more object models and/or machine learning models each tailored to one or more objects. For example, the models database 160 may include 3D object models of objects and the engine 120 may apply vision sensor data to a 3D object model to determine if the object modeled by the 3D object model is captured in the vision sensor data and/or to determine a pose of the object in the environment based on the application of the vision sensor data to the 3D object model. Also, for example, the models database 160 may include machine learning models and the engine 120 may apply vision sensor data as input to a machine learning model and generate, over the machine learning model, an indication of whether an object modeled by the machine learning model is captured in the vision sensor data and/or to determine a pose of the object in the environment. The models stored in the models database 160 may include models previously generated by the model generation system 130 and/or models generated based on other techniques.

Objects detected by the engine 120 and/or their poses may be utilized for various purposes by one or more other engines associated with the robot 110. For example, a detected object and its pose may be utilized to enable the robot 110 to grasp or otherwise manipulate the object, to enable the robot 110 to navigate while avoiding that object, to enable updating of a map of the robot's environment, etc.

The new object capture engine 125 causes vision sensor data to be captured, by vision sensor 111, so that the captured vision sensor data captures a given object from a plurality of vantages. For example, in some implementations the new object capture engine 125 may cause one of the grasping end effectors 115A, 115B to grasp the given object and move the object relative to the vision sensor 111. For instance, the engine 125 may provide control commands to one or more actuators that control the robot arm 114A and its end effector 115A to cause the end effector 115A to grasp the given object and move it relative to the vision sensor 111.

Figure 2A:
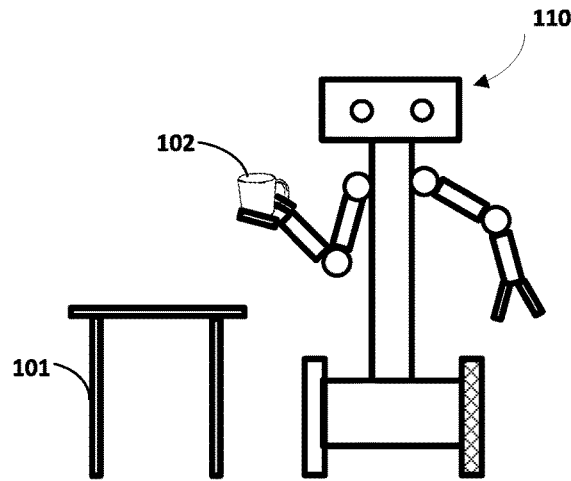
FIGS. 2A, 2B, 2C, and 2D illustrate examples of capturing, with a vision sensor of a robot, vision sensor data of a mug from a plurality of vantages.
Figure 2B:
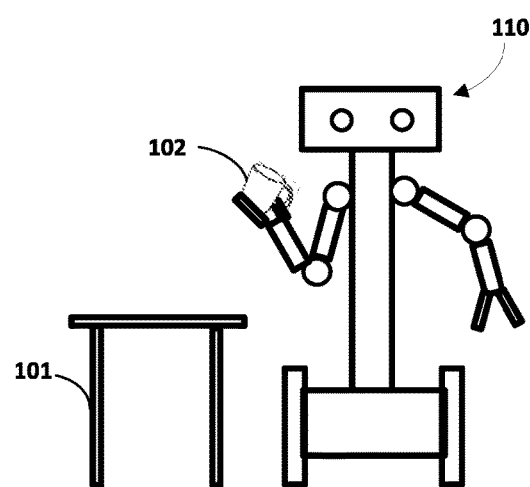

FIGS. 2A and 2B provide one example of the robot 110 grasping a mug 102 and moving it relative to the vision sensor 111 of the robot. Detailed numbering of the robot 110 is not provided in FIGS. 2A and 2B to simplify those figures, but can be ascertained with reference to FIG. 1. In FIG. 2A, the end effector 115A is grasping the mug 102 (e.g., it has picked it up from the table 101) and presents the mug 102 to the vision sensor 111 at a first vantage. In FIG. 2B, the pose of the end effector 115A has been adjusted through actuation of one or more of the actuators that control the pose of the end effector 115A. As a result of the adjustment of the pose of the end effector 115A, the mug 102 is presented to the vision sensor 111 at a second vantage. The vision sensor 111 may capture vision sensor data that captures the mug 102 at the vantages of FIGS. 2A and 2B. For example, the vision sensor 111 may capture at least a first image at the vantage of FIG. 2A and at least a second image at the vantage of FIG. 2B.

The vision sensor 111 may further capture sensor data at a plurality of additional vantages, such as additional vantages encountered by the mug 102 as it moves between those depicted in FIGS. 2A and 2B, and a plurality of additional vantages through further movement of the end effector 115A. In some implementations, end effector 115A may be adjusted relative to vision sensor 111 such that most, if not all, surfaces of the mug 102 are visible to the vision sensor 111. In some of those implementations, end effector 115A may optionally place and "regrasp" the mug 102 at a different location to enable further vision sensor data to be captured of portions of mug 102 that may have been obscured by the end effector 115A with the initial grasp of the mug 102. As described herein, in some implementations the vision sensor data may optionally be associated with timestamps and/or pose information related to the end effector 115A. That information may optionally be provided to the model generation system 130 to assist the object model engine 132 in generating an object model based on the vision sensor data.

In some implementations, to capture vision sensor data that captures a given object from a plurality of vantages, the new object capture engine 125 additionally and/or alternatively causes the vision sensor 111 to move relative to the given object. For instance, the engine 125 may provide control commands to one or more actuators that control the wheels 117A, 117B to move the robot relative to the object.

Figure 2C:
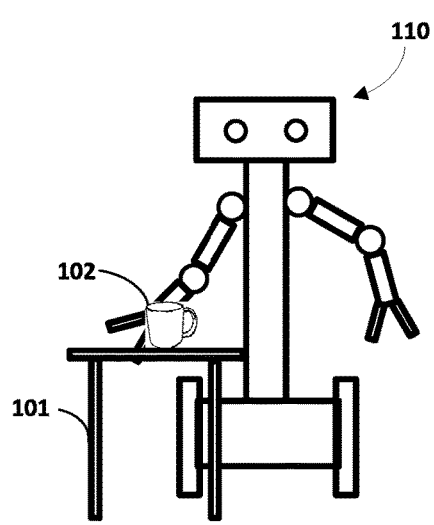
Figure 2D:
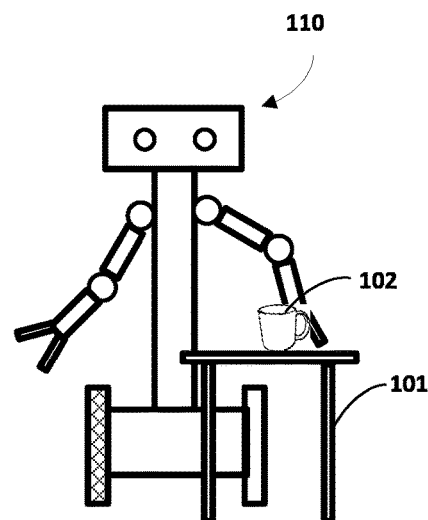

FIGS. 2C and 2D provide one example of the robot 110 and its vision sensor 111 moving relative to the mug 102, while the mug 102 is in a static pose on the table 101. Detailed numbering of the robot 110 is not provided in FIGS. 2C and 2D to simplify those figures, but can be ascertained with reference to FIG. 1. In FIG. 2C, the vision sensor 111 is at first pose and captures the mug 102 at a first vantage. In FIG. 2D, the robot 110 has moved through actuation of actuators that drive its wheels 117A, 117B, thereby moving the vision sensor 111 to a second pose where it captures the mug 102 at a second vantage. The vision sensor 111 may capture vision sensor data that captures the mug 102 at the vantages of FIGS. 2C and 2D. For example, the vision sensor 111 may capture at least a first image at the vantage of FIG. 2C and at least a second image at the vantage of FIG. 2D.

The vision sensor 111 may further capture sensor data at a plurality of additional vantages, such as vantages encountered in moving the vision sensor 111 between its poses depicted in FIGS. 2C and 2D, and a plurality of additional vantages through further movement of the robot 110. In some implementations, the robot 110 and the vision sensor 111 may be moved such that most, if not all, surfaces of the mug 102 are visible to the vision sensor 111. In some of those implementations, end effector 115A may optionally contact and move the mug 102 (e.g., tip it over) to enable further vision sensor data to be captured of portions of mug 102 that may be obscured by the table 101. As described herein, in some implementations the vision sensor data may optionally be associated with timestamps and/or pose information related to the vision sensor 111. That information may optionally be provided to the model generation system 130 to assist the object model engine 132 in generating an object model based on the vision sensor data.

The vision sensor data 105 that captures a given object from a plurality of vantages is provided by the new object capture engine 125 to the model generation system 130. The model generation system 130 uses the vision sensor data 105 to generate one or more models as described in more detail herein. In some implementations, the vision sensor data 105 is provided as part of a request to model generation system 130 to cause the model generation system 130 to generate a model of an object captured by the vision sensor data 105 and to provide the model in response to the request. In some of those implementations, the request may optionally include additional data such as additional images captured by the vision sensor 111 and/or other indications of an environment of the robot 110. In some implementations, multiple (e.g., all) components of a request are included in a single transmission to the system 130. In some other implementations, multiple components of a request are transmitted to the system 130 in separate transmissions.

In some implementations, the new object capture engine 125 causes the vision sensor data 105 to be captured and/or provided to the model generation system 130 in response to determining that an object captured by the vision sensor data 105 is not currently recognizable. In some of those implementations, determining that an object is not currently recognizable may be based on object detection and pose determination engine 120 failing to detect the object and/or failing to detect the object with at least a threshold level of confidence. For example, engine 120 may apply vision sensor data that captures the object to one or more (e.g., all) of the models of models database 160 and determine that the object is not recognizable based on the existing models of the models database 160. In response to the engine 120 determining that the object is not recognizable based on the existing models, the new object capture engine 125 may cause vision sensor data 105 that captures the object from multiple vantages to be captured and/or to be provide to model generation system 130.

In some implementations, the new object capture engine 125 may perform one or more actions in response to user interface input from one or more humans in the environment of the robot 110 and/or otherwise utilize human assistance in performing one or more actions. For example, in some implementations the engine 125 may capture vision sensor data 105 of an object from multiple vantages and/or provide the vision sensor data 105 in response to user interface input that indicates a desire of a human in the environment to have the object be recognizable. For instance, a user may provide a verbal command to a microphone associated with the robot 110 to indicate a desire to have an object that is in close proximity to the robot 110 to be recognizable. Also, for instance, a user may pick up an object and place it in one of the end effectors 115A and 115B (optionally in combination with a verbal command or other user interface input) to cause the robot 110 to capture the vision sensor data 105 of the object from multiple vantages. Also, for instance, a user may pick up an object and present it to the vision sensor 111 at multiple vantages to cause the robot 110 to capture the vision sensor data 105 of the object from those multiple vantages and/or to cause the robot 110 to provide the vision sensor data 105 to the model generation system 130.

As one particular non-limiting example of human assistance, the object detection and pose determination engine 120 may determine an object is not recognizable. In response to determining the object is not recognizable, the robot 110 may position one of the end effectors 115A, 115B close to the object and provide audible output of "do you want me to remember this object?". In response to affirmative audible input from the user, the robot 110 may provide further audible output of "please place the object in one of my grippers". In response to the object being placed in one of the end effectors 115A, 115B, the robot 110 may cause the end effector to present the object to the vision sensor 111 at a plurality of vantages, generate vision sensor data 105 at those vantages, and provide the vision sensor data to the model generation system 130.

Turning now to the model generation system 130, it is depicted in FIG. 1 as including an object model engine 132, a rendering engine 134, a training example engine 136, and a training engine 138. In some implementations, one or more of the engines may be combined and/or omitted—and/or one or more additional engines may be provided. All or aspects of the system 130 may be implemented by the robot 110 and/or by one or more computing systems that are in communication with the robot 110.

The object model engine 132 utilizes the received vision sensor data 105 to generate an object model 133 of an object captured by the vision sensor data 105, such as a partial three-dimensional ("3D") model of the object. The object model engine 132 may utilize various techniques to generate the object model 133. For example, where the vision sensor data 105 includes a plurality of images (e.g., "2D" or "2.5D" images), a partial 3D model of an object may be created based on isolating the object in each of multiple images that capture the object, and "stitching" together the object based on the channels that capture the object in each of the images. For instance, object model engine 132 may isolate the object in each of the images by removing background from the images, by removing robotic component(s) present in the image (e.g., the end effector), etc. The object model engine 132 may optionally stitch the object together based on pose information, timestamps, and/or other data associated with the multiple images. For example, the images may each be associated with pose information that indicates a relative pose between the object and a vision sensor that captured the object (e.g., based on a pose of the vision sensor and/or a pose of an end effector that optionally grasps the object in the image) and the pose information used to determine which images capture the same part of, or adjoining parts of, an object.

The object model 133 is provided to the rendering engine 134 and used by the rendering engine 134 to generate a plurality of rendered images 135 that capture the object model at a plurality of different poses relative to viewpoints of the rendered image. As used herein, "pose" references both position and orientation. For example, a pose of an object may define values for six degrees of freedom of the object. In some implementations, rendering an image based on a full or partial 3D object model means converting a portion of the 3D object model into a 2D or 2.5D image of that portion (e.g., an image with one or more color, grayscale, and/or depth channels). Various rendering techniques may be utilized such as rasterization, ray casting, radiosity, and/or ray tracing. In some implementations, the object model 133 is additionally and/or alternatively stored in the models database 160 for use by the robot 110.

Figure 3A:
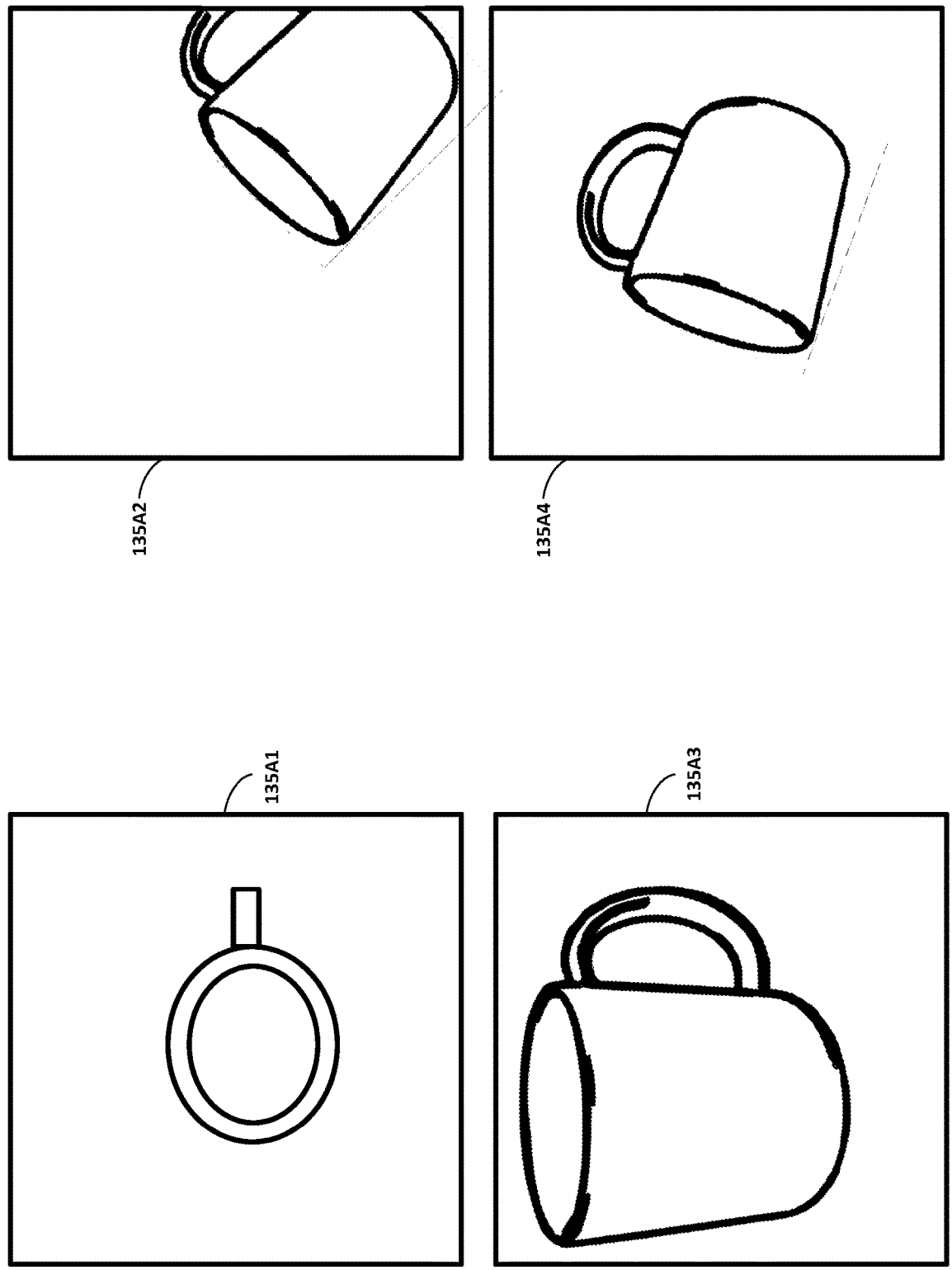
FIG. 3A illustrates four example rendered images generated based on an object model of the mug of FIGS. 2A-2D.

One example of rendered images that may be generated by the rendering engine 134 and that capture the object model 133 at a plurality of different poses relative to viewpoints of the rendered images is provided in FIG. 3A. FIG. 3A includes four rendered images 135A1-135A4 that are each renderings of an object model 133 of the mug 102 (FIG. 2). As described, the object model 133 of the mug 102 may be generated based on vision sensor data that captures the mug 102 from multiple vantages. As appreciated by viewing the rendered images 135A1-135A4, they each capture the mug 102 at a different pose relative to the viewpoints of the rendered images 135A1-135A4.

In various implementations, the rendering engine 134 may vary one or more rendering features across the rendered images 135 in generating rendered images based on an object model. In some of those implementations, the features may include additional content that is in addition to the rendering of the object model and that varies across multiple of the rendered images. For example, the additional content may be a background onto which the object model is rendered. For instance, a first image may render the object model onto a first background (e.g., an image of a patterned carpet), a second image may render the object model onto a second background (e.g., an image of a desk), etc. Also, for example, the additional content may include additional object models in scenes on which the rendered images are based and may vary by, for instance, including different additional object models in the scenes and/or including additional object models in different poses relative to the object model. For instance, a first image may be rendered based on a scene that includes a "target" object model of a mug, and includes additional object models of a plate and a vase that are positioned around the target object model. A second image may be rendered based on a scene that includes the target object model of the mug, and includes additional object models of a coffee maker, a pot, and a pan.

Figure 3B:
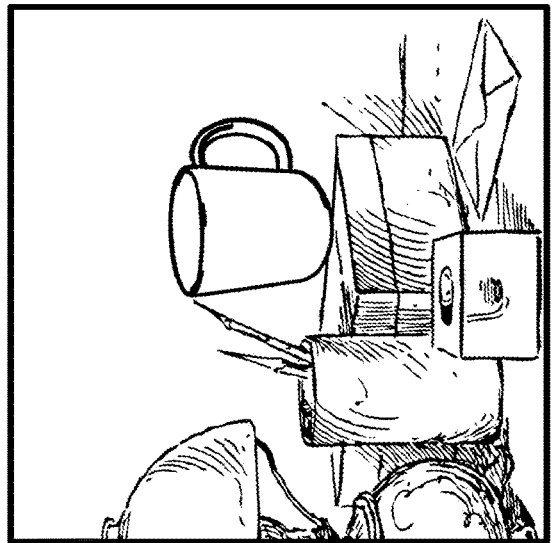
FIG. 3B illustrates four additional example rendered images generated based on an object model of the mug of FIGS. 2A-2D.
Figure 3B:
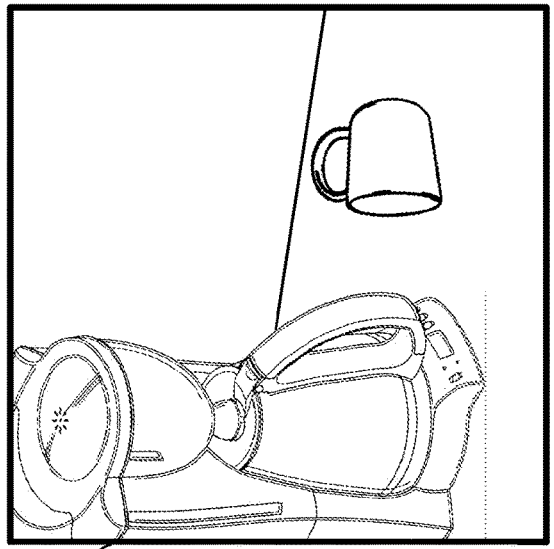
Figure 3B:
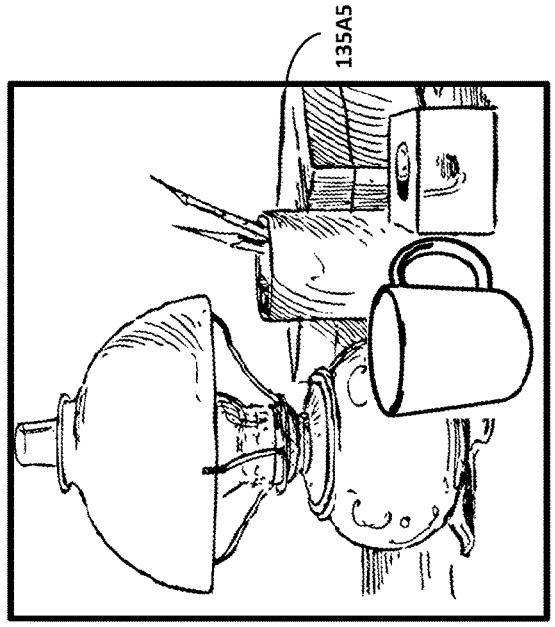
Figure 3B:
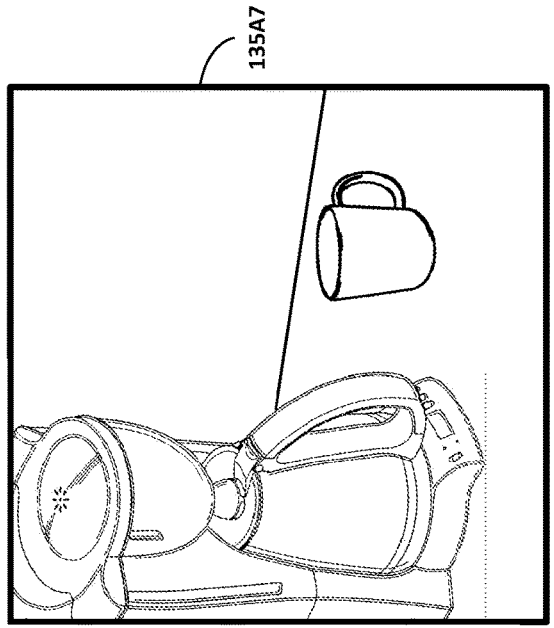

One example of rendered images that may be generated by the rendering engine 134 and that include additional content that is in addition to the rendering of the object model is provided in FIG. 3B. FIG. 3B includes four rendered images 135A5-135A8 that each include renderings of an object model 133 of the mug 102 (FIG. 2). As described, the object model 133 of the mug 102 may be generated based on vision sensor data that captures the mug 102 from multiple vantages. As appreciated by viewing the rendered images 135A5-135A8, they each also include varied additional content. For example, rendered image 135A5 includes a rendering of the object model 133 of the mug 102 at a first pose relative to a lamp and other desk items and the rendered image 135A6 includes a rendering of the object model of the mug 102 at a second pose relative to those desk items. Also, for example, rendered image 135A7 includes a rendering of the object model 133 of the mug 102 at a first pose relative to a coffeemaker and the rendered image 135A8 includes a rendering of the object model 133 of the mug 102 at a second pose relative to the coffeemaker. As described, the additional content items in FIG. 3B that are in addition to the rendering of the object model 133 of the mug 102 may be generated, for example, based on varying a background onto which the object model is rendered and/or including additional object models in scenes on which the rendered images are based. Although rendered images 135A1-135A8 are presented as 2D grayscale images given patent drawing constraints, it is understood that those images may optionally include one or more color channels and/or a depth channel in some implementations.

In some implementations, the rendering engine 134 may select one or more of the backgrounds and/or one or more of the additional object models utilized as additional content based on an environment of the robot 110. An indication of the environment of the robot 110 may be utilized to select the backgrounds and/or the additional object models. The indication of the environment may optionally be provided in a request along with the vision sensor data 105, or may be otherwise determined. As one example of selecting additional content based on an environment, if the robot 110 operates in a residential environment, then backgrounds that depict object(s) likely to be found in a residential environment may be utilized. As another example, actual images captured by the robot 110 may be used to generate the backgrounds. As yet another example, additional object models of objects likely to be found in a robot's environment may be included along with the object model in scenes on which rendered images are based. Rendering the object model with additional content that is based on the environment of the robot may enable a machine learning model to be trained that is tailored to the environment of the robot and that may provide improved performance in that environment relative to one or more models not trained based on the environment.

The rendering engine 134 may optionally vary additional and/or alternative features across the rendered images. For example, lighting magnitude and/or direction, translucency of the object model, color(s) of the object model, and/or other features may be varied.

The training example engine 136 generates training examples 137, which are used by training engine 138 for training a machine learning model 139 to detect the object and/or to estimate a pose of the object. The training example engine 136 uses the rendered images 135 as the training example input of the training examples. The training example engine 136 uses an indication of the object and/or a pose of the object in the corresponding image in generating the training example output of the training examples. For example, where the machine learning model 139 is to be trained to detect an object and to estimate a pose of the object, the training example output may include both the indication of the object and an indication of the pose of the object. The indication of the object can be an indication of whether the object is present and/or an identifier of the object. The identifier of the object can be a semantically meaningful identifier (e.g., "coffee cup") and/or an identifier that is not semantically meaningful (e.g., "3FE8OA51"). As one particular example, each training example may include a rendered image as training example output. As output, the training example may include a value that indicates the object is present in the rendered image and may include one or more values that indicate the pose of the object. In some implementations, the indication of whether the object is present may be the training example output and the identifier of the content may be assigned to the machine learning model.

The training example engine 136 can determine the pose of the object in a rendered image based on the viewpoint of the rendered image and the pose of the object model in the rendered image, which may be provided by rendering engine 134 with the rendered images 135. For example, the pose of the object in the rendered image can be the pose of the object model relative to the viewpoint of the rendered image. As another example, the pose of the object can be the pose of the object model relative to a reference frame of the robot 110, when the translation (if any) between the pose of the vision sensor 111 and the pose of the reference frame of the robot 110 is known. For instance, if the translation is known, the pose of a given rendered image may be determined based on adjusting, based on the translation, the pose of the object model relative to the viewpoint of the rendered image.

In some implementations, the training example engine 136 also generates training examples 137 based on the images that are used to generate the object model and/or additional "real world" (non-rendered) images of the object, such as real world images captured by the vision sensor 111. The additional training examples may each include one of the images (optionally resized or otherwise transformed) as training example input and the identifier of the object as training example output. In implementations where the machine learning model is trained to also estimate the pose of the object, the additional training examples may also include a pose of the object as training example output. The pose of the object for a real world image may be determined, for example, based on mapping the image to the generated object model of the object and/or based on sensor data provided by the robot that captured the image (e.g., based on a pose of the end effector of the robot where the object is grasped by the end effector in capturing the image). In some implementations, negative training examples may also be utilized that include training example input of an image that does not include the object and include training example output that indicates the object is not present.

The training engine 138 uses the training examples 137 to train the machine learning model 139. In some implementations, the machine learning model 139 is a neural network model, such as a convolutional neural network ("CNN") model. Generally, a CNN model is a multilayer learning framework that includes an input layer, one or more convolutional layers, optional weight and/or other layers, and an output layer. During training of the CNN by the training engine 138, the CNN is trained to learn a hierarchy of feature representations. Convolutional layers of the network are convolved with filters and optionally down-sampled by pooling layers. Generally, the pooling layers aggregate values in a smaller region by one or more downsampling functions such as max, min, and/or normalization sampling.

In some implementations, the training performed by the training engine 138 comprises performing backpropagation on the convolutional neural network based on the training example output of the training examples 137. As one example, the training engine 138 may supply an image for an instance of the training examples 137 to an input layer of the machine learning model 139 and perform backpropagation on the machine learning model based on the training example output of the instance of the training example. The training engine 138 may similarly perform additional backpropagations each based on one or more instances of the training examples 137, until all training examples 137 have been utilized and/or other training criteria has been satisfied.

In some implementations, the machine learning model is configured and trained to detect and/or predict the pose of only a single object or single class of objects. For example, output generated over the model may provide an indication of whether a particular object or class of objects is present, and optionally an estimated pose. In some implementations, the machine learning model is configured and trained to detect and/or predict the pose of multiple objects or multiple classes of objects. Accordingly, in those implementations a single pass over a single machine learning model may be utilized to detect whether each of multiple objects is present and/or to predict poses of those present object(s). For example, output generated over the model may provide an indication of whether a first particular object or class of objects is present, and indication of whether a second particular object or class of object is present, etc.—and optionally an estimated pose for one or more of the particular objects or classes indicated to be present.

Figure 4:
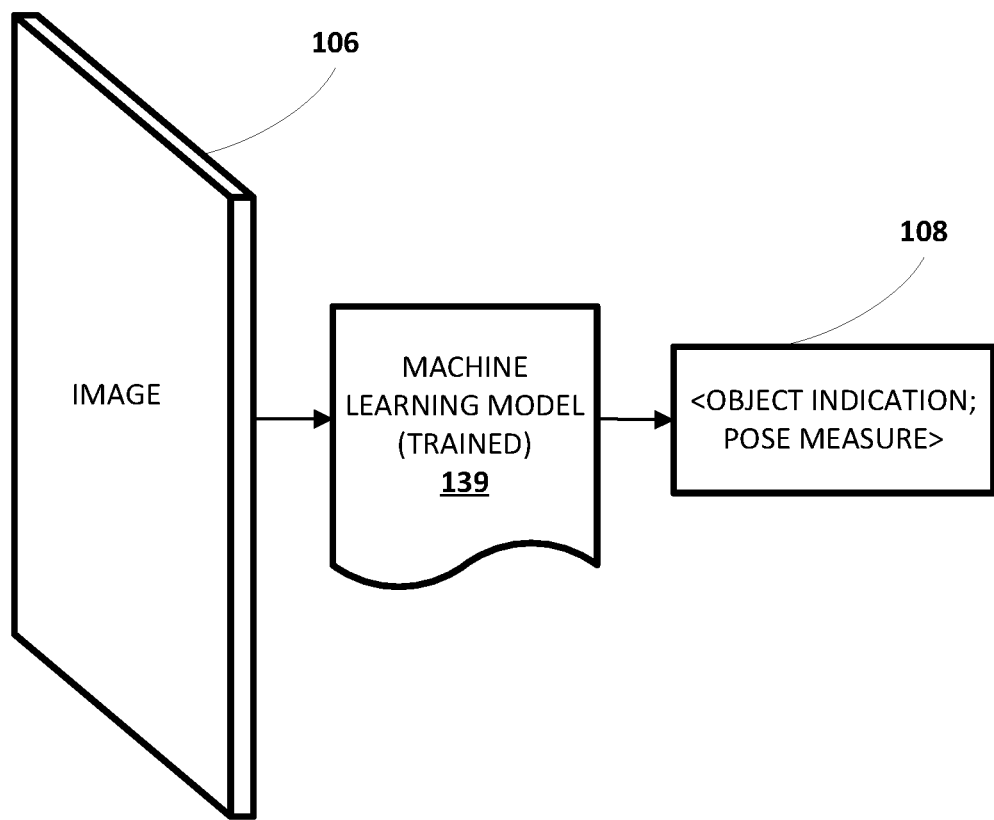
FIG. 4 illustrates an example trained machine learning model, an example input that can be applied to the trained machine learning model, and an example output that can be generated over the trained machine learning model.

FIG. 4 illustrates an example of the machine learning model 139 after it has been trained according to techniques described herein. The machine learning model 139 includes an input layer, an output layer, and a plurality of hidden layers and may be a CNN model in some implementations. The machine learning model 139 is illustrated with an example image 106 that can be provided as input to the input layer of the machine learning model 139. The machine learning model 139 is also illustrated with example output 108 that may be generated over the machine learning model 139. The output 108 includes an object indication which may be, for example, a value that indicates whether a particular object is present in the image. For instance, the value may be a value from 0 to 1 that indicates likelihood the object is present in the image 106. The output 108 also includes a pose measure that indicates a pose of the object. The pose measure may be, for example, a measure that defines estimated values for each of six degrees of freedom for the object relative to a reference frame.

Figure 5:
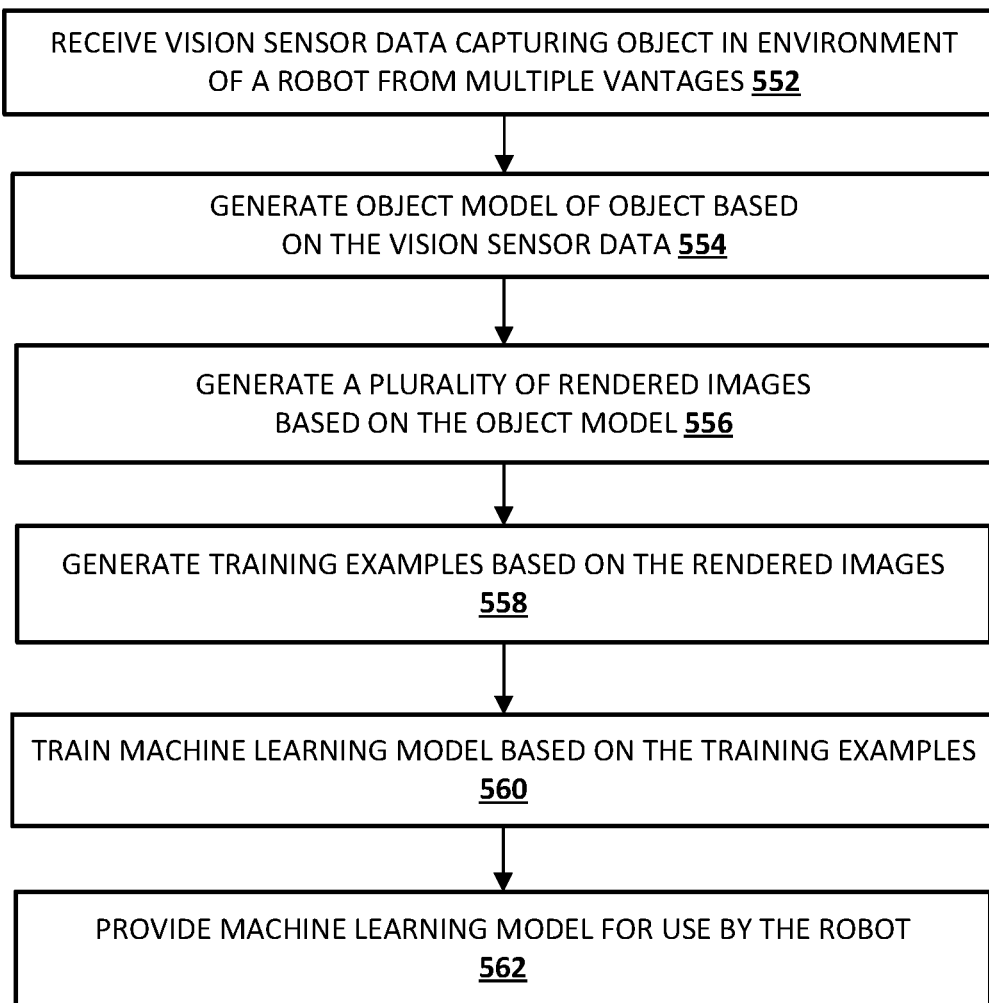
FIG. 5 is a flowchart illustrating an example method according to some implementations disclosed herein.

FIG. 5 is a flowchart illustrating an example method 500 according to some implementations disclosed herein. For convenience, the operations of the flow chart are described with reference to a system that performs the operations. This system may include one or more components of the model generation system 130 and/or one or more components of a robot, such as a processor and/or robot control system of robot 110, 720, and/or other robot. Moreover, while operations of method 500 are shown in a particular order, this is not meant to be limiting. One or more operations may be reordered, omitted or added.

At block 552, the system receives vision sensor data capturing an object in the environment of a robot from multiple vantages. For example, the vision sensor data may have been captured by a vision sensor associated with the robot in response to the robot encountering the object and/or determining that the object is unrecognizable. The system may receive the vision sensor data as part of a request submitted by the robot.

At block 554, the system generates an object model of the object based on the vision sensor data. For example, the system may generate at least a partial 3D model of the object based on the vision sensor data. For instance, the system may isolate the object in each of multiple images of the received vision sensor data and stitch together the object as it is captured in each of the images. In generating the object model, the system may optionally utilize timestamps, pose information, and/or other information included with the vision sensor data received at block 552.

At block 556, the system generates a plurality of rendered images based on the object model. The rendered images capture the object model at a plurality of different poses relative to viewpoints of the rendered image. In some implementations, the system varies one or more rendering features across the generated rendered images. In some of those implementations, the features may include additional content that is in addition to the rendering of the object model and that varies across multiple of the rendered images. In some variations of those implementations, some or all of the additional content may be selected based on an environment of the robot.

At block 558, the system generates training examples based on the rendered images. The system may use the rendered images as training example input. As training example output of each of the training examples, the system may include an indication of the object and/or a pose of the object in the corresponding rendered image.

At block 560, the system trains a machine learning model based on the training examples. For example, the system may, for each of a plurality of training examples, apply the training example input of a training example to the machine learning model and perform backpropagation on the machine learning model based on the output of the training example. Additional training examples may optionally be utilized to train the machine learning model, such as "real world" images of the object and/or negative training examples that don't include the object. The machine learning model is trained to enable detection of the object and/or estimation of the pose of the object based on application of future vision sensor data (e.g., a future image) over the trained machine learning model.

At block 562, the system provides the trained machine learning model for use by the robot. In some implementations, the system additionally and/or alternatively provides the trained machine learning model for use by additional robots, such as additional robots that operate in an environment that is similar to (or the same as) the environment in which the robot that submitted the request operates. In some implementations, the system provides the trained machine learning model for storage in one or more databases that are accessible to a plurality of additional robots. The trained machine learning model may optionally be stored with an indication of the object for which it was trained and/or the environment based on which it was trained (when it was trained based on additional content selected based on the environment).

Additional iterations of the method 500 may be performed in response to additional requests from the robot and/or additional robots to train machine learning models for additional objects and/or additional environments.

Figure 6:
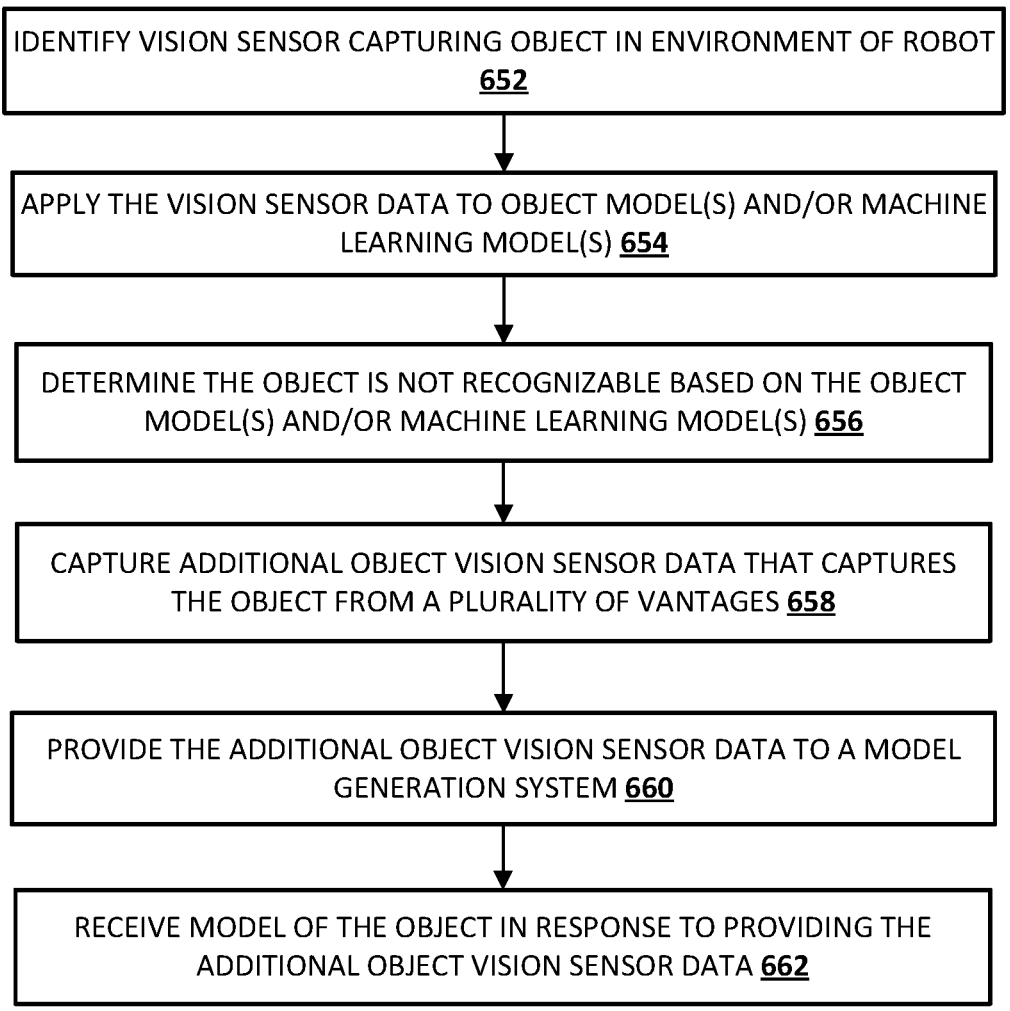
FIG. 6 is a flowchart illustrating an example method according to some other implementations disclosed herein.

FIG. 6 is a flowchart illustrating an example method 600 according to some other implementations disclosed herein. For convenience, the operations of the flow chart are described with reference to a system that performs the operations. This system may include one or more components of the object detection and pose determination engine 120, the new object capture engine 125, and/or one or more components of a robot, such as a processor and/or robot control system of robot 110, 720, and/or other robot. Moreover, while operations of method 600 are shown in a particular order, this is not meant to be limiting. One or more operations may be reordered, omitted or added.

At block 652, the system identifies vision sensor data capturing an object in the environment of a robot. For example, the system identifies vision sensor data captured by a vision sensor of the robot.

At block 654, the system applies the vision sensor data to one or more object models and/or machine learning models. For example, the system may apply the vision sensor data to one or more (e.g. all) 3D object models accessible to the system and/or to one or more (e.g., all) machine learning models accessible to the system.

At block 656, the system determines the object is not recognizable based on the object models and/or the machine learning models. For example, the system may determine that the models fail to detect the object and/or fail to detect the object with at least a threshold level of confidence.

At block 658, the system captures additional object vision sensor data that captures the object from a plurality of vantages. For example, the system may capture the additional object vision sensor data based on moving a vision sensor of the robot (e.g., via locomotion of the robot) relative to the object and/or moving the object relative to the vision sensor (e.g., via grasping and moving the robot with an end effector of the robot).

At block 660, the system provides the additional object vision sensor data to a model generation system. For example, the system may provide the vision sensor data to a model generation system that implements one or more aspects of the method 500 of FIG. 5.

At block 662, the system receives the model of the object in response to providing the additional object vision sensor data at block 660. The received model of the object may include an object model (e.g., an at least partial 3D model) and/or may include a trained machine learning model (e.g., trained based on one or more aspects of the method 500 of FIG. 5). The system may use the model of the object in detecting and/or estimating the pose of the object based on future vision sensor data captured by the system.

Additional iterations of the method 600 may be performed to receive models for additional unrecognized objects.

Figure 7:
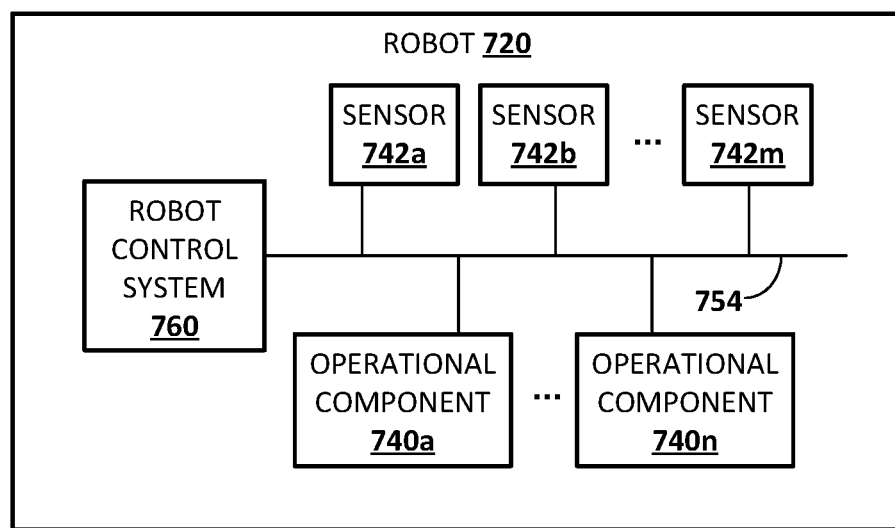
FIG. 7 schematically depicts an example architecture of a robot.

FIG. 7 schematically depicts an example architecture of a robot 720. The robot 720 includes a robot control system 760, one or more operational components 740a-740n, and one or more sensors 742a-642m. The sensors 742a-742m may include, for example, vision sensors, light sensors, pressure sensors, pressure wave sensors (e.g., microphones), proximity sensors, accelerometers, gyroscopes, thermometers, barometers, and so forth. While sensors 742a-m are depicted as being integral with robot 720, this is not meant to be limiting. In some implementations, sensors 742a-m may be located external to robot 720, e.g., as standalone units.

Operational components 740a-740n may include, for example, one or more end effectors and/or one or more servo motors or other actuators to effectuate movement of one or more components of the robot. For example, the robot 720 may have multiple degrees of freedom and each of the actuators may control actuation of the robot 720 within one or more of the degrees of freedom responsive to the control commands. As used herein, the term actuator encompasses a mechanical or electrical device that creates motion (e.g., a motor), in addition to any driver(s) that may be associated with the actuator and that translate received control commands into one or more signals for driving the actuator. Accordingly, providing a control command to an actuator may comprise providing the control command to a driver that translates the control command into appropriate signals for driving an electrical or mechanical device to create desired motion.

The robot control system 760 may be implemented in one or more processors, such as a CPU, GPU, and/or other controller(s) of the robot 720. In some implementations, the robot 720 may comprise a "brain box" that may include all or aspects of the control system 760. For example, the brain box may provide real time bursts of data to the operational components 740a-n, with each of the real time bursts comprising a set of one or more control commands that dictate, inter alia, the parameters of motion (if any) for each of one or more of the operational components 740a-n. In some implementations, the robot control system 760 may perform one or more aspects of method 600 described herein. For example, in some implementations all or aspects of the control commands generated by control system 760 during a given time period may be based on capturing vision sensor data that captures an object from multiple vantages.

Although control system 760 is illustrated in FIG. 7 as an integral part of the robot 720, in some implementations, all or aspects of the control system 760 may be implemented in a component that is separate from, but in communication with, robot 720. For example, all or aspects of control system 760 may be implemented on one or more computing devices that are in wired and/or wireless communication with the robot 720, such as computing device 810.

Figure 8:
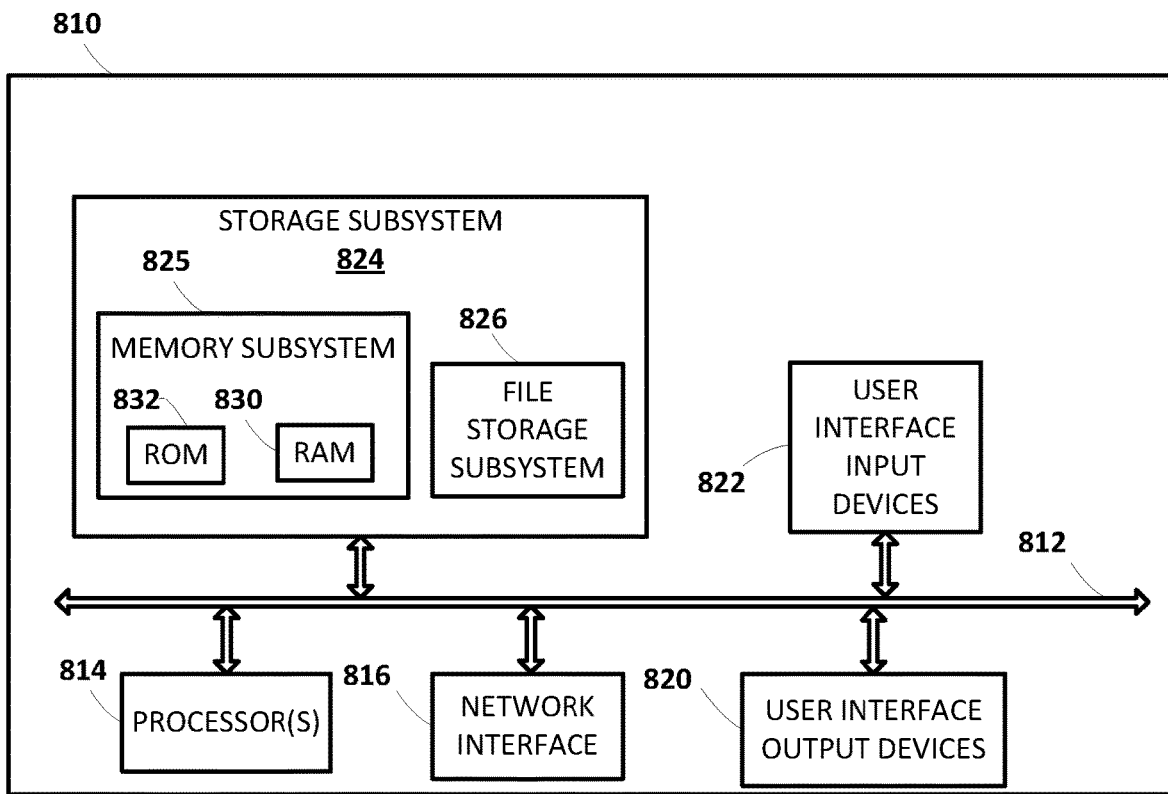
FIG. 8 schematically depicts an example architecture of a computer system.

FIG. 8 is a block diagram of an example computing device 810 that may optionally be utilized to perform one or more aspects of techniques described herein. Computing device 810 typically includes at least one processor 814 which communicates with a number of peripheral devices via bus subsystem 812. These peripheral devices may include a storage subsystem 824, including, for example, a memory subsystem 825 and a file storage subsystem 826, user interface output devices 820, user interface input devices 822, and a network interface subsystem 816. The input and output devices allow user interaction with computing device 810. Network interface subsystem 816 provides an interface to outside networks and is coupled to corresponding interface devices in other computing devices.

User interface input devices 822 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 810 or onto a communication network.

User interface output devices 820 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 810 to the user or to another machine or computing device.

Storage subsystem 824 stores programming and data constructs that provide the functionality of some or all of the modules described herein. For example, the storage subsystem 824 may include the logic to perform selected aspects of the method of FIGS. 5 and/or 6.

These software modules are generally executed by processor 814 alone or in combination with other processors. Memory 825 used in the storage subsystem 824 can include a number of memories including a main random access memory (RAM) 830 for storage of instructions and data during program execution and a read only memory (ROM) 832 in which fixed instructions are stored. A file storage subsystem 826 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 826 in the storage subsystem 824, or in other machines accessible by the processor(s) 814.

Bus subsystem 812 provides a mechanism for letting the various components and subsystems of computing device 810 communicate with each other as intended. Although bus subsystem 812 is shown schematically as a single bus, alternative implementations of the bus subsystem may use multiple busses.

Computing device 810 can be of varying types including a workstation, server, computing cluster, blade server, server farm, or any other data processing system or computing device. Due to the ever-changing nature of computers and networks, the description of computing device 810 depicted in FIG. 8 is intended only as a specific example for purposes of illustrating some implementations. Many other configurations of computing device 810 are possible having more or fewer components than the computing device depicted in FIG. 8.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method, comprising:
identifying vision sensor data generated by a vision sensor coupled to a robot, the vision sensor data capturing a portion of an environment of the robot, including an object in the environment;
determining, based on output generated from application of the vision sensor data to a machine learning model, that the machine learning model fails to detect the object with at least a threshold level of confidence;
in response to determining the machine learning model fails to detect the object:
generating a plurality of training examples based on one or both of: the vision sensor data, and additional vision sensor data that is generated by the vision sensor and that captures the object, and
training the machine learning model based on the plurality of training examples; and
after training the machine learning model based on the plurality of training examples:
using, by the robot, the machine learning model that has been trained based on the plurality of training examples to detect the object based on further vision sensor data generated by the vision sensor coupled to the robot.

2. The method of claim 1, further comprising:
receiving, via a user interface input device associated with the robot, user interface input from a human in the environment of the robot;
wherein generating the plurality of training examples and training the machine learning model are further in response to receiving the user interface input.

3. The method of claim 2, wherein the user interface input device is a microphone, the user interface input is verbal input, and the user interface input indicates a desire to have the object be recognizable.

4. The method of claim 2, wherein the user interface input is affirmative input provided in response to audible output rendered by the robot.

5. The method of claim 1, wherein generating the plurality of training examples comprises generating a given training example, of the plurality of training examples, based on the additional vision sensor data.

6. The method of claim 5, further comprising:
capturing the additional vision sensor data after using an end effector, of the robot, to move the object relative to the vision sensor.

7. The method of claim 5, further comprising:
capturing the additional vision sensor data after moving the vision sensor, wherein moving the vision sensor is via locomotion of the robot.

8. A system, comprising:
a robot comprising one or more robot processors and a vision sensor capturing a portion of an environment of the robot, wherein the portion of the environment includes an object, and wherein the one or more robot processors are configured to:
identify vision sensor data generated by the vision sensor, and
determine, based on output generated from application of the vision sensor data to a machine learning model, that the machine learning model fails to detect the object with at least a threshold level of confidence;
a model generation system implemented by one or more processors, wherein the model generation system is configured to:
in response to determining that the machine learning model fails to detect the object:
generate a plurality of training examples based on one or both of: the vision sensor data, and additional vision sensor data that is generated by the vision sensor and that captures the object, and
train the machine learning model based on the plurality of training examples;
wherein after training the machine learning model based on the plurality of training examples, one or more of the robot processors use the machine learning model that has been trained based on the plurality of training examples to detect the object based on further vision sensor data generated by the vision sensor coupled to the robot.

9. The system of claim 8, wherein in generating the plurality of training examples, the model generation system is configured to generate a given training example, of the plurality of training examples, based on the additional vision sensor data.

10. The system of claim 8, wherein one or more of the processors that implement the model generation system include one or more of the robot processors.

11. The system of claim 8, wherein one or more of the robot processors are further to:
receive, via a user interface input device associated with the robot, user interface input from a human in the environment of the robot;
wherein generating the plurality of training examples and training the machine learning model are further in response to receiving the user interface input.

12. The system of claim 11, wherein the user interface input device is a microphone, the user interface input is verbal input, and the user interface input indicates a desire to have the object be recognizable.

13. The system of claim 11, wherein the user interface input is affirmative input provided in response to audible output rendered by the robot.

14. The system of claim 8, wherein generating the plurality of training examples comprises generating a given training example, of the plurality of training examples, based on the additional vision sensor data, and wherein one or more of the robot processors are further to:
capture the additional vision sensor data after using an end effector, of the robot, to move the object relative to the vision sensor.

15. The system of claim 8, wherein generating the plurality of training examples comprises generating a given training example, of the plurality of training examples, based on the additional vision sensor data, and wherein one or more of the robot processors are further to:
capture the additional vision sensor data after moving the vision sensor, wherein moving the vision sensor is via locomotion of the robot.

* * * * *